United States Patent
Voss et al.

(10) Patent No.: US 6,235,384 B1
(45) Date of Patent: *May 22, 2001

(54) AQUEOUS LAMINATING ADHESIVE COMPOSITION AND A METHOD OF USING THEREOF

(75) Inventors: Peter A. Voss, St. Paul; Thomas E. Rolando, Maple Grove, both of MN (US)

(73) Assignee: H. B. Fuller Licensing & Financing, Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/090,468

(22) Filed: Jun. 4, 1998

(51) Int. Cl.$^7$ ............... B32B 5/16; B32B 27/00
(52) U.S. Cl. .......... 428/341; 428/423.1; 428/423.5; 428/423.7; 428/424.2; 428/424.8
(58) Field of Search .............. 428/423.1, 423.5, 428/423.7, 424.2, 474.4, 477.4, 480, 500, 502, 506, 341

(56) References Cited

U.S. PATENT DOCUMENTS

| | | | |
|---|---|---|---|
| 5,011,881 | 4/1991 | Fuji et al. | 524/457 |
| 5,147,926 | 9/1992 | Meichsner et al. | 524/591 |
| 5,281,655 | 1/1994 | Mitsuji et al. | 524/507 |
| 5,334,690 | 8/1994 | Schafheutle et al. | 528/71 |
| 5,354,609 * | 10/1994 | Wang | 428/317.5 |
| 5,532,058 | 7/1996 | Rolando et al. | 428/341 |
| 5,608,000 | 3/1997 | Duan et al. | 524/591 |
| 5,610,232 | 3/1997 | Duan et al. | 524/840 |
| 5,612,115 * | 3/1997 | Kinoshita et al. | 428/141 |
| 5,637,639 | 6/1997 | Duan et al. | 524/591 |
| 5,652,299 * | 7/1997 | Nakajima et al. | 524/589 |
| 5,738,926 * | 4/1998 | Kinoshita | 428/141 |

FOREIGN PATENT DOCUMENTS

801086A1 * 10/1997 (EP) .
11061083A * 3/1999 (JP) .

* cited by examiner

Primary Examiner—Paul Thibodeau
Assistant Examiner—Sheeba Ahmed

(57) ABSTRACT

The present invention relates to an aqueous laminating adhesive composition and a method of using thereof. More particularly, the invention relates to an aqueous laminating adhesive composition comprising at least one aqueous polyurethane polymer dispersion (A), at least one aqueous non-polyurethane polymer dispersion (B) prepared by free radical polymerization, and at least one water dispersible polyfunctional crosslinking agent (C). Improved bonded properties of dry laminated flexible film substrates such as polyolefin, polyester and polyamide, as well as cellophane, metals or paper are obtained.

18 Claims, No Drawings

AQUEOUS LAMINATING ADHESIVE COMPOSITION AND A METHOD OF USING THEREOF

FIELD OF THE INVENTION

The present invention generally relates to an aqueous laminating adhesive composition and a method of using thereof in adhesives for manufacturing laminate structures. More particularly, the invention is directed to an aqueous laminating adhesive composition comprising a stabilized polyurethane dispersion to which are added crosslinking agents at the time of use. One particularly important application of such dispersions is as adhesives in the manufacture of laminates from thin flexible sheet substrates.

BACKGROUND OF THE INVENTION

In general, the function of a laminating adhesive is to join together different or similar substrates, e.g., polyethylene, polypropylene, polyester, polyamides, metal, paper or cellophane to form composite films used for many different purposes. A suitable laminating adhesive is expected to provide excellent bonds on numerous substrates with only a small application of adhesives. Large amounts of such laminates are used in the packaging industry, especially in making food packaging. Due to environmental, health and safety reasons, it is preferred that the adhesives be solvent free.

Aqueous linear or crosslinked aqueous polyurethane dispersions may be used in a wide range of commercial applications such as coatings and adhesives as shown in several patents including U.S. Pat. Nos. 5,147,926, 5,610,232, 5,637,639, 5,608,000 and 5,334,690.

U.S. Pat. No. 5,147,926 disclose crosslinkable aqueous polyurethane dispersion having long shelf life and containing polyurethanes which have carbonyl and polyhydrazides and their use for the preparation of printing inks.

U.S. Pat. No. 5,01,881 is directed to aqueous coating composition comprising aqueous acrylic resin and urethane resin emulsion in the absence of a crosslinking agent. The coatings are used for plastic substrates.

U.S. Pat. No. 5,281,655 is directed to aqueous coating composition for metallic and plastic substrates. The composition comprising a urethane resin emulsion, a resin for use in aqueous coating composition and a hydrophobic melamine resin as a crosslinking agent. There is no disclosure regarding the use of the composition as a laminating adhesive.

U.S. Pat. No. 5,281,655 is directed to an aqueous polyurethane dispersion and its use in the manufacturing of laminate structures. The adhesive comprises a prepolymer comprising a reaction product of an aliphatic polyfunctional isocyanate compound, and an acid functional polyol component, wherein said prepolymer is dispersed in water in the presence of a dispersion stabilizing amount of a tertiary amine.

The present inventors have found an alternate stabilizer for use in dispersing a polyurethane prepolymer in water that is surprisingly effective while not adding to VOCs (volatile organic contents) of the dispersion.

SUMMARY OF THE INVENTION

The present invention is generally directed to an aqueous laminating adhesive composition and its use in adhesives for manufacturing laminate structures. It has been discovered that improved bonded properties of dry laminated flexible film substrates, such as laminates comprising films of thermoplastics, such as polyolefin, polyesters and polyamides as well as paper, cellophane, and metals particularly after exposure to boiling water, are obtained with polyurethane dispersion adhesives when a polyfunctional aziridine, a carbodiimide compound or mixtures thereof is employed as the crosslinker of the adhesive system.

The invention comprises a polyurethane polymer dispersed in an aqueous vehicle, the polymer having a plurality of carboxyl or sulfonic groups thereon which are stabilized with ammonia to result in a clear, stable aqueous dispersion, which can further be chained extended and crosslinked. Surprisingly, ammonia effectively neutralizes the acid groups, is volatile enough to be driven off during any drying step without leaving an unwelcome odor. It also does not contribute to the VOC of the adhesive system, thus making it even more environmentally friendly than the adhesives disclosed in U.S. Pat. No. 5,532,058, which uses tertiary amines as stabilizers.

Another aspect of the present invention is a dry bonded laminate comprising a pair of flexible film substrates bonded with an adhesive, the laminating adhesive composition comprising a polyurethane polymer having carboxylic or sulfonic acid groups thereon which are stabilized with ammonia, and a crosslinker comprising a polyfunctional aziridine, a carbodiimide compound or mixtures thereof, wherein said ammonia stabilizer is easily driven off during the drying step without leaving an unwelcome odor.

A further aspect of the invention is a curable adhesive prepared by blending the two parts at the time of use, the first part comprising a polyurethane polymer having carboxylic or sulfonic acid groups thereon which are stabilized with ammonia, and the second part is a crosslinker comprising a polyfunctional aziridine, a carbodiimide compound or mixtures thereof. Surprisingly, the ammonia stabilized system can be crosslinked without encountering any problem, to produce an effective laminating adhesive.

A still further aspect of the invention comprises a method of manufacturing a flexible film laminate comprising applying to a first flexible film substrate an aqueous adhesive composition comprising an aqueous dispersion of polyurethane polymer having plural carboxylic or sulfonic acid groups thereon which are stabilized with ammonia, and a crosslinking agent, drying the adhesive, and then applying a second flexible film substrate to the dried substrate.

The adhesive exhibits excellent adhesion in a variety of film/film and film/foil, etc. lamination applications. As mentioned before, large amounts of laminating adhesives are used in the packaging industry, especially in making food packaging.

DETAILED DESCRIPTION OF THE INVENTION

The polyurethane polymer dispersion employed in the present invention have carboxylic or sulfonic acid groups on the polyurethane polymer molecule which are neutralized with ammonia. Such dispersion may be prepared by well known procedures involving the following steps:
i) reacting a mixture of a) an aliphatic polyfunctional isocyanate compound, and b) an acid functional polyol component to form a polyurethane prepolymer; and then
ii) dispersing the resulting polyurethane prepolymer in water in the presence of a dispersion stabilizing amount of ammonia.

Suitably, the prepolymer is left with a residual level (typically 2.0–3.0%) of isocyanate groups which can be reacted with chain extenders and chain terminators after dispersion so as to increase the molecular weight of the dispersed polymer and provide pendant reactive crosslinkable groups. The final polyurethane polymer is substantially free (<0.5%) of isocyanate groups.

Particularly preferred polyurethane polymer dispersions are prepared from aliphatic polyisocyanate which are characterized by median particle sizes of about 80 nm or less, typically about 30–80 nm, preferably about 70 nm or less. Median particle sizes are determined conventionally, for instance by the use of a BI-90 particle sizer sold by Brookhaven Instruments. The small particle size dispersion of the invention are almost clear and have improved application properties, especially using rotogravure application machinery.

In the preferred embodiments, the aliphatic isocyanate is a hindered isocyanate compound. The use of a hindered isocyanate helps prevent isocyanurate trimer formation during polymer manufacture and reduces the reactivity of residual isocyanate groups on the prepolymer. The hindered isocyanate can be any di-, tri- or polyfunctional isocyanate having tertiary aliphatic isocyanate functionality. Representative non-limiting examples of such isocyanates include m-tetramethylxylene diisocyanate and p-tetramethylxylene diisocyanate. Other polyisocyanate containing at least one sterically hindered group such as isophorone diisocyanate (IPDI) are usually employed in the preferred embodiments.

The plural isocyanate compound is reacted with polyol component providing acid functionality that will permit formation of stable dispersions in aqueous solution. The acid functional polyol component may comprise a polyol having at least two isocyanate reactive hydrogen and at least one acid functional group or a combination of polyol free of acid functionality having at least two isocyanate reactive hydrogens together with another compound having acid functionality and hydroxy, amine or thiol functionality.

Preferably, the polyhydroxy polymer compound or polyol used to make the prepolymer of the invention has a molecular weight of about 500 to about 3,000, preferably about 1,000 to about 2,000. Such polymers can be polyester condensation products of commercially available dicarboxylic acids and hydroxy compounds such as diols, triols, tetraols, etc. Additionally, such polymers can be polyether diols, triols, etc. based on polymers of ethylene oxide or propylene oxide.

The polyhydroxyl materials or polyols can be either low or high molecular weight materials and in general will have average hydroxyl values as determined by ASTM E 222–67, Method B, between about 1000 and 10 and preferably between about 500 and 50. The polyols include low molecular weight diols, triols and higher alcohols, low molecular weight amide containing polyols and higher polymeric polyol such as polyester polyol, polyether polyol and hydroxy containing acrylic interpolymer.

The polyol component of the prepolymer reaction may comprise an acid grafted polyether polyol such as polypropylene oxide grafted with for example, maleic or fumaric acid as taught in Frentzel, U.S. Pat. No. 4,460,738 or Knopf, U.S. Pat. No. 4,528,334 and are incorporated herein by reference. Other polyester polyols produced from mixtures of di- and tri- or higher functional acid and polyol components in ratios which provide residual acid functionality as well as plural hydroxy groups may be employed.

Alternatively, the polyol component comprises a mixture of a polyol free of acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, aminosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, a alanine, 6 aminocaproic acid, the reaction products of ethanolamine and acrylic acid, hydroxyethylpropionic acid, 2 hydroxyethanesulfonic acid and sulphanilic acid.

Desirably, the polyurethane prepolymer has sufficient acid groups to provide an acid number of between about 10 and 30, preferably between about 16 and 20.

Where flexible and elastomeric properties are desired, the polyurethane prepolymer should preferably contain at least a portion of a higher molecular weight polymeric polyol, i.e., absence of trifunctional or higher functionality ingredients, to avoid any chance of gelling of the resultant polymeric product and should have a hydroxyl number of about 200 or less, preferably within the range of about 150 to 30.

The most suitable polymeric polyols include polyalkylene ether polyols including thioethers, polyester polyols including polyhydroxy polyesteramides, and hydroxy containing polycaprolactones and hydroxy-containing acrylic interpolymers.

Any suitable polyalkylene ether polyol may be used. Included are poly(oxytetramethylene) glycols, poly(oxyethylene) glycols, polypropylene glycols and the reaction product of ethylene glycol with a mixture of propylene oxide and ethylene oxide.

Also useful are polyether polyols formed from the oxyalkylation of various polyols. For example, glycols such as ethylene glycol, 1,6 hexanediols, Bisphenol A and the like, higher polyols such as trimethylol propane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of acidic or basic catalyst.

Polyester polyol can be used as a polymeric polyol component in the practice of this invention. The polyester polyols can be prepared by polyesterification of organic polycarboxylic acids or anhydrides thereof with organic polyols. Usually, the polycarboxylic acids and polyols are aliphatic or aromatic dibasic acids and diols. Suitable polyester polyols are sold by Ruco Corp. under Rucoflex trademark, including Rucoflex 1011, 1019, 108, 1015, 1035, 1040, 101, 102, 1037and 1095.

The diols that are usually employed in making the polyester include alkylene glycols such as ethylene glycol and butylene glycol, neopentyl glycol and other glycols such as hydrogenated Bisphenol A, cyclohexane diol, cyclohexane dimethanol, caprolactone and ethylene glycol, hydroxyalkylated bisphenols, polyether glycols, for example poly(oxytetramethylene)glycol and the like. However, other diols of various types and, as indicate polyols of higher functionality can also be utilized. Such higher polyols can also include, for example, trimethylolpropane, trimethylethane, pentaerythritol and the like, as well as higher molecular weight polyols such as those produced by oxyalkylating low molecular weight polyol. An example of such high molecular weight polyol is the reaction product of 20 moles of ethylene oxide per mole of trimethylol propane.

In a preferred embodiment, the polyfunctional polyol compound is reacted with hindered aliphatic polyfunctional isocyanate in the presence of a strong catalyst at a temperature of from about 40° to 140° C., more preferably from about 50° to 120° C. and most preferably from about 60° to 100° C. A representative non-limiting list of catalysts which may be used to drive this reaction include t-amines, organometallics such as dibutyltinlaurate, tin oleate, lead naphthanate, etc. Tin catalysts are preferred. The hindered isocyanate can be reacted with the polyol at an isocyanate/OH ratio of about greater than 1.1 moles of isocyanate per mole of OH and most preferably about 1.4 to 1.7 moles isocyanate per mole OH. When a small molecule polyol with pendant acid functionality is used with an acid free polyol, the acid compound can be added at a rate of about 5 to 15 wt % of the polyol.

The polyurethane polymer is suitably stabilized in dispersion by neutralization of the acid functional groups on the polymer with ammonia. Small amounts of other stabilizers can also be present. These can include tertiary amine compound. Suitably, the tertiary amine compound has three aliphatic substituents. Such substituents can be $C_{1-15}$ alkyl groups which may be optionally cyclic aliphatic groups. The tertiary amine may also be cyclic aliphatic amine compound. Specific examples of tertiary amine include trimethylamine, triethylamine, tri-n-propyl amine, tri-n-butyl amine, N-methylpiperidine, N-ethylpiperidine, N-ethylpiperidine, N-methylpyrrolidone, ethyldipropyl amine, etc. In the preferred dispersions, when the acid number is between about 16 and 20, the amount of the neutralizing agent used in the prepolymer forming reaction should at least be sufficient to completely neutralize all the acid groups on the prepolymer.

In the formation of the preferred adhesive polymer dispersion for use in the invention, a preferred polymer can be manufactured by reacting di or tri isocyanate compound, an acid functional polyol, additional optional amounts of polyol free of acid functionality and amounts of chain extending agents and chain terminating agents that cooperate to control the molecular weight. Generally, it is desirable to utilize chain extending and terminating agents after the dispersion of the prepolymer in water. Suitable chain extenders are compounds having two or more amine groups more reactive to isocyanate than water. Suitable chain terminators are compounds having a single isocyanate reactive amine group.

The chain extending agent is added in a proportion that leaves less than 0.5 wt %, generally less than 0.1 wt %, preferably 0% of free reactive isocyanate. The chain termination agent is used in an amount that controls molecular weight to about 1,500 to 10,000 and results in little free isocyanate, i.e., less than 0.5 wt. %. Small molecule chain extending agents and small molecule chain terminating agents, when used, are preferably added at a rate of less than about 5 wt % of the dispersed polyurethane prepolymer. If high molecular weight agents are used, amounts should be adjusted accordingly.

The di-, tri-, etc. amines which can be employed in the preparation of the urethanes of the invention can be primary or secondary diamines or polyamines in which radicals attached to nitrogen atoms can be saturated or unsaturated, aliphatic, alicyclic, aromatic, aromatic substituted aliphatic, aliphatic substituted aromatic or heterocyclic. Mixed amines in which the radicals are different such as, for example, aromatic and aliphatic can be employed and other non-reactive groups can be present attached to the carbon atom such as oxo, sulfo, halo or nitroso. Aminoalcohols and aminophenols can be employed as chain terminators which leave a residual hydroxyl group available for subsequent crosslinking reactions. Representative, non-limiting examples include monoethanolamine and p-aminophenol.

The final dispersed polyurethane polymer used in the adhesives of the present invention is substantially free of reactive isocyanate groups, is typically hydroxy or amine terminated and usually has a substantial proportion of neutralized acid functional pendant groups which stabilize the polymer in aqueous dispersion.

The polyurethane polymer dispersion preferably has a solids content of from about 10 to about 80 wt %, preferably from about 20 to about 60 wt % and most preferably from about 30 to about 40 wt %. Further, the polymer dispersion has a low viscosity of from about 25 to 2,000 cps, preferably from about 50 to about 1,000 cps and most preferably from about 100 to 300 cps.

The polyurethane dispersion will remain storage stable and fully dispersed within the liquid vehicle for an extended period of time. During storage, the level of particle separation or degree of particle dispersion is broken or particle clamping can interfere with the formation of an effective bond.

The dispersions are used with a crosslinking agent to produce a laminating adhesive for hot-fill, boil-in-bag and retortable packaging materials. Crosslinking agents are preferably added to the polyurethane dispersion neat or as a solution or dispersion, and just prior to use.

As mentioned before, due to environmental, health and safety reasons, it is preferred that the adhesives contain as low a VOC as possible, hence the use of aqueous dispersions. However, in order for the polyurethane prepolymers to form a stable dispersion in water, acid groups are neutralized in the past with tertiary amines, which can add to the VOC of the dispersion. Surprisingly, ammonia has both the required properties of good stabilizers, as well as meeting the low VOC demands of the adhesive. The resultant adhesives have improved adhesion, bond strength, and resistance properties at room temperature and elevated temperature, as well as excellent processability and storage stability of the laminating adhesive compositions.

Epoxy compounds can be any small molecular or polymeric compound or mixtures thereof having more than one epoxy group/molecule. Useful polyepoxies include glycidyl ethers of polyphenols such as bisphenol A or a polyol such as butanediol.

As stated above, the crosslinking agent is preferably added to the polyurethane dispersion of the invention prior to the application of the mixture to the substrate. Suitable crosslinking agents such as aziridine compound are present in an amount of about 1% to about 20% by weight based on the adhesives polymer solids content, preferably about 1% to about 5%. Epoxy compounds, when employed as co-crosslinking agents, may be employed at a level of about 0.1% to about 10% by weight based on adhesive polymer solids, preferably about 0.5 to about 5%. Carbodiimide is employed in an amount of about 0.5% to about 20% by weight based on adhesives polymer solids content, preferably about 1% to about 5%.

Application may be performed by spraying, roll coating, the use of doctor blades, brushing or dipping. For flexible film substrates, roll coating suitably by rotogravure is preferred. The adhesive can be applied to a wide variety of substrates including non-polar thermoplastics, for example polyolefins (e.g., polypropylene and polyethylene in various forms such as low density polyethylene (LDPE) oriented polypropylene (OPP) and linear low density polypropylene (LLDP)); polyesters such as polyethylene terephthalate (PET), metal films, nylon, paper, cellophane, metallized polyester, etc. and is especially suitable for preparation of flexible retortable packaging laminate materials.

If desired, more than one prepolymer can be dispersed, again utilizing ammonia as a stabilizer. Also, non-polyurethane dispersions can be mixed with any of the above polyurethane dispersions prior to the addition of the crosslinking agent.

For typical flexible film laminate materials, application is at a rate of 0.85–6.8 g preferably 1.7–3.4 g, adhesive solids per $m^2$ will generally provide satisfactory results.

After the adhesive dispersion has been applied to the first substrate, it is dried to form an adhesive film on the surface of the substrate. Any method known to those skilled in the art may be used to dry the adhesive including conventional ovens, circulating ovens, infrared radiations, heat lamps as well as flash drying the adhesive on the substrate surface. Substantially all of the ammonia stabilizer used are driven off during this process, leaving the composite substantially odorless.

It may be desirable to laminate one film having excellent moisture vapor barrier properties or oxygen barrier properties to another film having excellent strength characteristics. The choice of substrates would therefore be up to the skilled practitioner in the art to achieve a laminate of particular desired properties for the user.

The use of heat and pressure to apply the second substrate facilitates bonding and crosslinking. Typically, a film coating and laminating apparatus will run at a rate of 100–600 linear feet (30–180 linear meters) of film per minute, will use a drying oven 10–25 feet long (3–8 meters) at 120° F. to about 130° F. (about 50° C. to about 60° C.), and will apply the second film substrate to the dried adhesive at a nip pressure of about 20 to about 60 psi and a temperature of about 110° F. to about 220° F. (about 40° C. to about 105° C.). Other application such as drying and curing temperature can be readily employed by those skilled in the art.

The following specific examples are provided to better assist the reader in the various aspects of practicing the present invention. As these specific examples are merely illustrative, nothing in the following descriptions should be construed as limiting the invention in any way.

EXAMPLES

Example 1

Into a three neck flask equipped with a thermometer, inert gas source and mechanical stirrer was placed 16.3 grams of poly(propyleneoxide)diol (Voranol 220–110, Dow Chemical, 3.9 grams of adipic/hexanediol/isophthalic acid polyester diol (Rucoflex 1019–35), 1.2 grams of dimethylpropionic acid, 8.1 grams of tetramethylxylenediisocyanate (TMXDI) and 0.01 grams dibutyltindilaurate were added and the mixture heated at 200° F. (93° C.) and held for approximately 3.5 hours until NCO content of 2.0% was achieved. The resulting polyurethane prepolymer was then added to 68 grams of water containing 0.9 grams of ammonia (equivalent to 100% neutralization) with vigorous stirring. After all the prepolymer was added, a mixture of 2 grams of water 0.3 grams ethylenediamine and 0.15 grams of ethanolamine were added to the dispersion. The resulting dispersion contains 30% solids and a pH of 8.0. Other properties are as follows:

AcidNumber 16.5

Median particle size 70 nm

Appearance clear

Shelf life stability greater than 3 months

A two part adhesive formulation was prepared the first part being the polyurethane dispersion described above, the second part being plural aziridine compound 1-aziridine propanoic acid, 2-methyl-, 2-ethyl-2[[3-(2-methyl-1-aziridinyl)-1-oxopropoxy]methyl]1,3-propanediyl ester. The weight blend ratio, solids basis was 48/48/2.

Example 2

Into a three neck flask equipped with a thermometer, inert gas source and mechanical stirrer was placed 13.3 grams of polyether triol (Voranol 230–112 Dow Chemical) and 1.3 grams of phthalic anhydride. The contents were heated to 310–320° F and held approximately 1 hour until an acid number of 34±1 was achieved. The resulting acid functional polyester polyol was cooled at 150° F. (66° C.) and 14 grams of an adipic/isophthalic/hexanediol polyester (Rucoflex 1019–55), and 5.7 grams of IPDI (Huls) were added and the mixture heated at 170° F. (77° C.) and held for approximately 1 hour until NCO content of 2.4% was achieved. The prepolymer was then added to 62.1 grams of water containing 0.9 grams of ammonia with vigorous agitation. After all the prepolymer was added, a mixture of 2 grams water, 0.4 grams of ethylenediamine and 0.3 grams of ethanolamine was added to the dispersion. The resulting dispersion contained 35% solids and a pH of 7.5. The median particle size was 70 nm. The acid number of the prepolymer was 135.

A two part adhesive was prepared, the first part being polyurethane dispersion as described above, a second part being the plural aziridine compound 1-aziridine. The weight blend ratio, solids basis was 48/48/2.

Example 3

A formulation A of Example 2 prepared by blending the polyurethane dispersion with 1 -aziridinepropanoic acid 2-methyl-, 2-ethyl-2[[3-(2-methyl-1-aziridinyl)-1-oxopropoxy]methyl]1,3-propanediyl ester at a solids basis weight ratio of 98/2.

A formulation C was prepared using Example 2 polyurethane dispersion, with plural carbodiimide UCARLINK XL-29SE at a solids basis weight ratio of 97/3.

A formulation D was prepared by blending polyurethane dispersion of Example 2, PN-3759-Z-X with plural epoxy compound dispersion employed in Example 2 at a solids basis weight ratio of 96/4.

Laminates of PET film to aluminum metal foil and polypropylene were conducted using a coating and laminating machine running at a rate of 300 ft/min. (90 m/min), applying the blended adhesive to a PET film substrate by rotogravure at a level of 1.7 $g/m^2$, solids basis passing the adhesive coated film through a 15 foot (5 meter) drying oven at a temperature of 150° F. (65° C.) and a pressure of 40 psi. The laminates were cured at ambient temperature for three days before testing. Tests were performed on 1 inch (2.54 cm) test strips. The test strips were then tested for 180° peel at a rate of 12 inches/min. (30.5 cm).

Example 4

The bonded laminates were used to prepare 10.16 cm by 10.16 cm pouches. The laminate was allowed to cure for 3 days before the pouch was made. The pouch was filled with water and placed in a test chamber at ambient room temperature having 100% relative humidity. After 1 day and 6 days the laminates were visually inspected for signs of delamination or tunneling. The laminates "pass" the humidity test if no visible signs of delamination or tunneling are detected.

TABLE I

FILM LAMINATING PERFORMANCE

| | Peel Strength (grams) | | Resistance Properties | |
|---|---|---|---|---|
| | | | 4" × 4" Water Filled Pouch @ 100% Humidity | 4" × 4" Water Filled Pouch- Ambient |
| Adhesive | PET/Foil | PET/PP | Days to Failure | Days to Failure |
| A (aziridine) | 1100 | film destruct | 7+ | 7+ |
| C (carbodiimide) | 950 | film destruct | 7+ | 7+ |
| D (epoxy) | 900 | 500 | 4 | 7+ |

The above examples have been depicted solely for the purpose of exemplification and are not intended to restrict the scope or embodiments of the invention. The invention is further illustrated with reference to the claims that follow thereto.

What is claimed is:

1. A dry-bonded laminate comprising a pair of flexible film substrates bonded with a curable adhesive, prepared by blending two parts at the time of use, the first part comprising at least one polyurethane prepolymer dispersed in an aqueous vehicle, the prepolymer having a plurality of carboxylic or sulfonic acid groups thereon which are neutralized with ammonia, said neutralized carboxylic or sulfonic acid groups being derived from a polyol having at least one carboxylic or sulfonic acid group thereon, said polyol having been incorporated into said polyurethane prepolymer by reaction of the polyol with a polyisocyanate; and the second part being a crosslinker for the polyurethane prepolymer of the first part and comprising a compound having a plurality of carbodiimide groups or a compound having a plurality of aziridine groups or plurality of epoxy groups, the laminate prepared by applying to a first flexible film substrate an aqueous dispersion of said two parts; drying the applied adhesive; and then applying a second flexible film substrate to the dried adhesive;

wherein said ammonia effectively neutralizes said acid groups without contributing to an increase in low volatile organic content (VOC).

2. A laminate as in claim 1 wherein said aziridine or carbodiimide compound is present on a polymer solids basis in the adhesive at a level of 1–20% by weight for an aziridine compound or 0.5–20% by weight for a carbodiimide compound.

3. A laminate as in claim 1 wherein a least one of said flexible film substrates comprises a non-polar thermoplastic material.

4. A laminate as in claim 1 wherein at least one of said flexible film substrates is selected from the group consisting of polyolefins, polyesters and polyamides.

5. A laminate as in claim 1 wherein at least one of said substrate is selected from the group consisting of water vapor barrier property, oxygen barrier property, and high mechanical strengther.

6. A laminate as in claim 1 wherein said crosslinker comprises a compound having a plurality of aziridine groups thereon.

7. A laminate as in claim 1 wherein said adhesive is present therein at a level of between 0.85–6.8 g per m².

8. A laminate as in claim 1 wherein at least one of said flexible film substrates is a metal foil or metalized polyester.

9. A laminate as in claim 8 wherein the second of said flexible film substrates is selected from the group consisting of polyolefins, polyesters and polyamides.

10. A laminate as in claim 1 characterized by a 180° peel strength of at least 500 grams after immersion in boiling water for 1 hour when tested at a rate of 12 inches/minute on 1 inch test strips.

11. A laminate as in claim 1 wherein the first part of the adhesive is free of organic solvent.

12. A dry laminate comprising a pair of flexible film substrates bonded with a curable adhesive, prepared by blending two parts at the time of use, the first part comprising a polyurethane prepolymer dispersed in an aqueous vehicle, the polyurethane prepolymer comprising the reaction product of a compound having a plurality of isocyanate groups thereon and a polyol component comprising a compound having a plurality of carboxylic or sulfonic acid groups thereon, said carboxylic or sulfonic acid groups having been neutralized with ammonia; wherein said ammonia effectively neutralizes said acid groups without contributing to an increase in low volatile organic content (VOC);

the second part being a crosslinker for the polyurethane polymer of the first part and comprising a compound having a plurality of carbodiimide groups or a compound having a plurality of aziridine groups, the laminate prepared by applying to a first flexible film substrate an aqueous dispersion of said two parts; drying the applied adhesive; and then applying a second flexible film substrate to the dried adhesive.

13. A laminate as in claim 12 wherein, after said reaction between said compound having a plurality of isocyanate groups thereon and polyol component, a polyurethane prepolymer had been obtained which has a residual level of isocyanate groups thereon, said prepolymer having been dispersed in an aqueous vehicle with ammonia of said acid groups, and said polyurethane polymer dispersed in said aqueous vehicle had been obtained by chain extension reaction of said prepolymer with a compound having two or more amine groups per molecule.

14. A laminate as in claim 12 wherein the crosslinker comprises a compound having a plurality of aziridine groups which is present in the adhesive at a level of 1–20% by weight on a polymer solids basis.

15. A laminate as in claim 12 wherein said crosslinker comprises a compound having a plurality of aziridine groups thereon.

16. A laminate as in claim 12 wherein at least one of said flexible film substrates is a metal foil or metalized polyester.

17. A laminate as in claim 12 wherein the first part of the adhesive is free of organic solvent.

18. A flexible package comprising a joint between a plurality of sections of flexible substrate bonded together by a layer of adhesive comprising the composition of claim 1.

* * * * *